United States Patent [19]

Norton et al.

[11] 4,270,715
[45] Jun. 2, 1981

[54] RAILWAY CONTROL SIGNAL INTERLOCKING SYSTEMS

[75] Inventors: David J. Norton; Christopher R. Brown, both of Chippenham, England

[73] Assignee: Westinghouse Brake & Signal Co., London, England

[21] Appl. No.: 41,628

[22] Filed: May 23, 1979

[30] Foreign Application Priority Data

Jun. 10, 1978 [GB] United Kingdom ............... 26665/78

[51] Int. Cl.³ .............................................. B61L 27/00
[52] U.S. Cl. .......................................... 246/5; 371/36
[58] Field of Search ........................ 246/5, 4, 3, 167 R, 246/131; 307/211; 371/36

[56] References Cited

U.S. PATENT DOCUMENTS 3,783,250  1/1974  Fletcher et al. ....................... 371/36

FOREIGN PATENT DOCUMENTS 1489921  10/1977  United Kingdom ........................ 246/5

Primary Examiner—Reinhard J. Eisenzopf
Attorney, Agent, or Firm—Larson and Taylor

[57] ABSTRACT

The specification discloses an electronic or computer-based railway control signal interlocking system. Signals representing the settings or conditions of railway control elements e.g. track circuits, signals and points, and their control signals are checked as usual by the interlock equipment to establish route safety. However failures in the system may only be discovered when a change to a control element setting is attempted. Since long periods can elapse between changes a failure may lie dormant for some time. In order to reduce dormant wrong side failure periods to a minimum the signals supplied to the interlocking equipment are periodically switched to a predetermined state chosen to prove that when the interlocking equipment receives the switched signal that a wrong side failure mode does not exist in the switched signal path.

9 Claims, 5 Drawing Figures

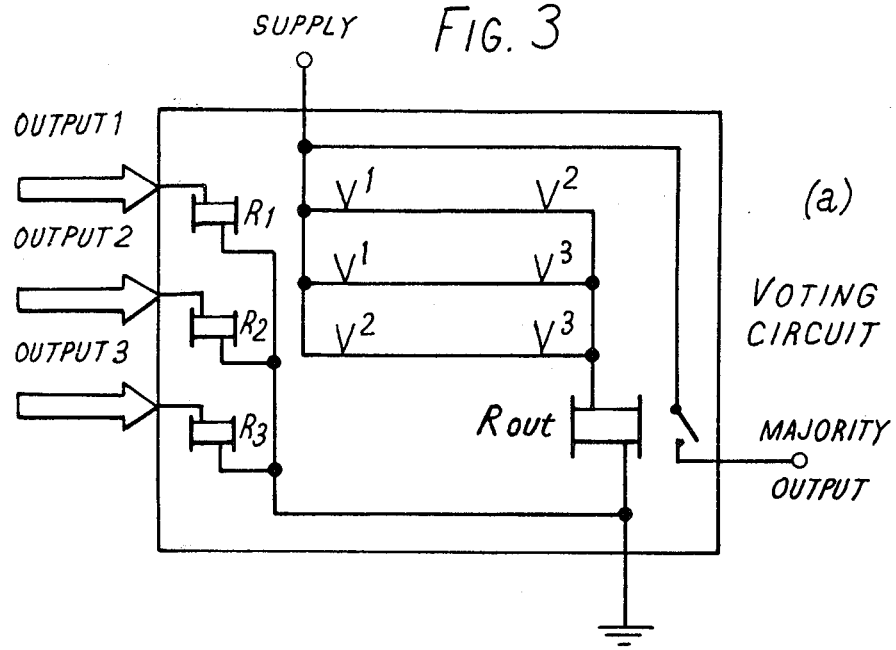
FIG. 3
(a) VOTING CIRCUIT
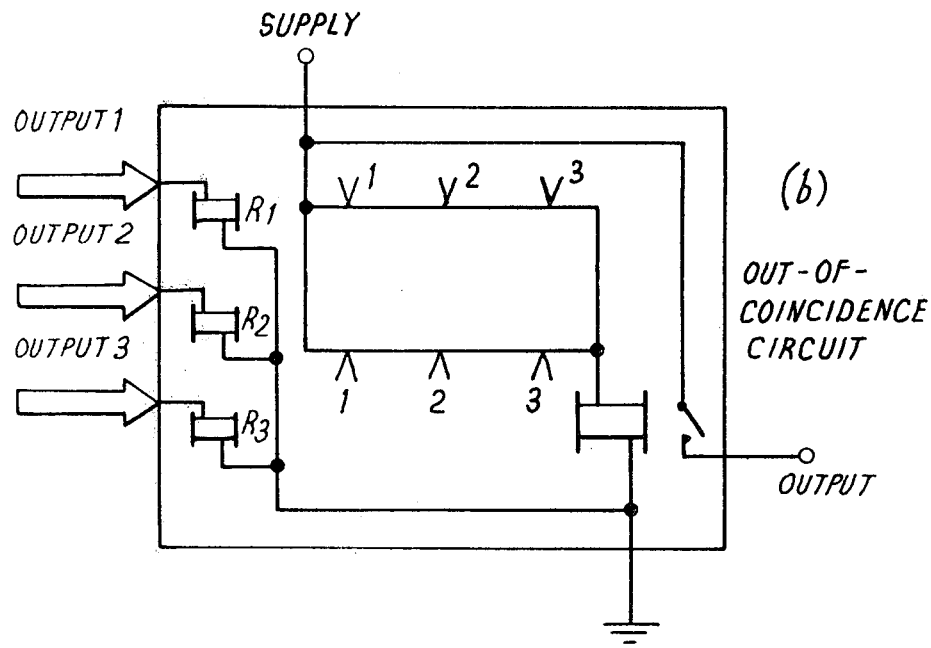
(b) OUT-OF-COINCIDENCE CIRCUIT

FIG. 4
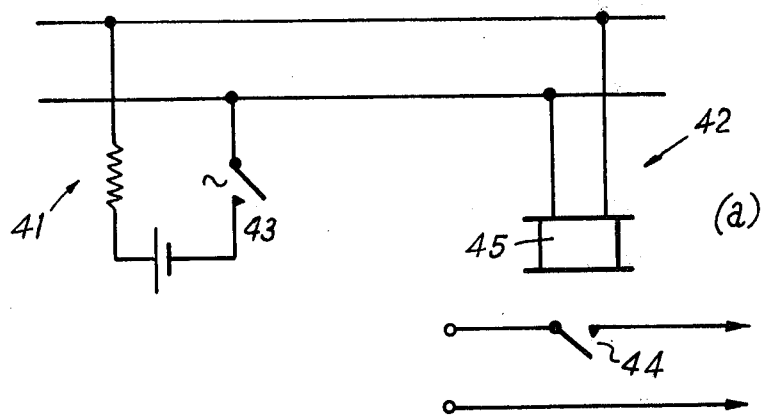
(a)
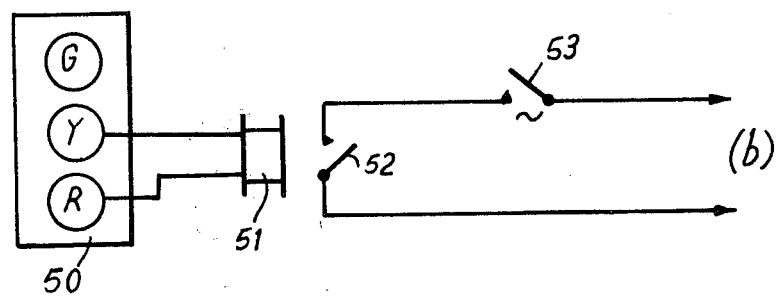
(b)
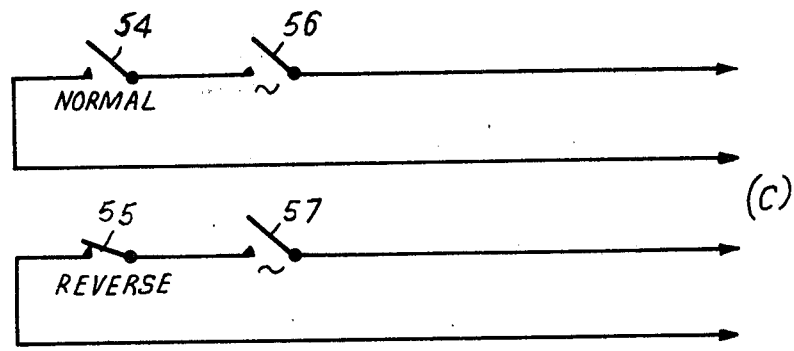
(c)

RAILWAY CONTROL SIGNAL INTERLOCKING SYSTEMS

This invention relates to control systems and particularly but not exclusively to computer based railway control signal interlocking systems.

The invention is generally applicable to control systems in which several inputs, which may change only after or over a relatively long period, representing sensed system parameters are evaluated to detect the existence of an at least potentially unsafe condition. The confidence with which such a condition can be detected is dependent upon the reliability of the inputs so that if, for example, an input is constant at a certain value because of a failure but it is not expected to vary anyway that confidence must be low.

Therefore an object of the present invention is to provide means by which an unsafe or potentially unsafe condition is diagnosed in such a control system.

Conventioal railway control signal interlocking systems are designed to be inherently fail safe and for this purpose the basic system building blocks are themselves designed to be or are used in such a manner as to be inherently fail safe for example, the interlocking relays are not only designed to be robust but are operated on a fail safe energise to operate basis. The electronic circuits and computer systems employed in interlocking systems presently being proposed or developed are not inherently fail safe in the same sense as conventional railway control systems. One method of providing a degree of inherent safety is described in our granted U.K. Pat. No. 1,489,921.

An object of the present invention is to provide by additional or alternative means an inherently safe railway control system.

According to one feature of the invention a control system includes input circuit means for receiving a plurality of input signals, switching means for periodically switching the input signals into a predetermined state and control means responsive to the switched inputs to diagnose the existence of an at least potentially unsafe system condition, the predetermined state and the location of the switching means being chosen to prove that in respect of an alternating input detected by the control means at least the respective input circuit means has not failed.

According to another feature of the invention railway control signal interlocking means includes a plurality of input circuits connected to a plurality of traffic control elements to receive therefrom input signals each in one of several alternative states according to the setting or condition of a control element and to perform in response thereto control signal interlocking functions, and switching means for causing the input signals to be switched periodically into a predetermined one of the alternative states, the arrangement being such that the predetermined state is chosen to prove that for an alternating input signal at least the input circuit in the interlocking means has not failed to a possible wrong side failure mode.

According to a further feature of the invention the signal switching means is located at the input to an input circuit of the interlocking means so as to prove that the input circuit has not failed to a possible wrong side failure mode.

According to another feature of the invention the signal switching means is located at the traffic control elements and is arranged in combination with signal generating means coupled thereto so as to prove that the control element, the associated input circuit and connections therebetween have not failed to a possible wrong side failure mode.

In order that the invention may be fully understood and readily carried in practice a preferred embodiment will now be described, by way of example only, with reference to the accompanying drawings in which:

FIG. 3(a) is a schematic circuit diagram of a comparison circuit for combining redundant output signals.

FIG. 3(b) is a schematic circuit diagram of an out-of-coincidence circuit for checking redundant output signals, and FIG. 4 shown in schematic form the gating circuits associated with the three basic track control elements, at (a) a track circuit, at (b) signal lamps and at (c) points.

Railway traffic is controlled using three basic control elements namely: track circuits to indicate the position of trains, signals to govern the speed of trains and points to control the path of trains. These three elements are found in systems in which trains are both manually and automatically operated. Whilst failures are inevitable great emphasis has always been placed on ensuring that, as far as possible, any failed control element fails to a safe state, i.e. a right side failure, even so wrong side failures remain possible occurrences. With conventional electronic or electrical railway control systems failures are usually only detected when an attempt is made to change the state or position of a control element. Thus, if a failure occurs in a section of track not frequently used the failure may remain undetected for some time, for example on a track normally used by passenger traffic a fault occurring during late evening might not be detected until next morning.

In one type of railway traffic control system in which the invention may be employed the control elements and their respective status signalling switches are extremely reliable and it is considered of little advantage to introduce the checking procedure of the invention at the control elements. However the data processing equipment at the central control office is of more recently developed form and some means of checking its data handling circuits is advantageous.

Figure 1:
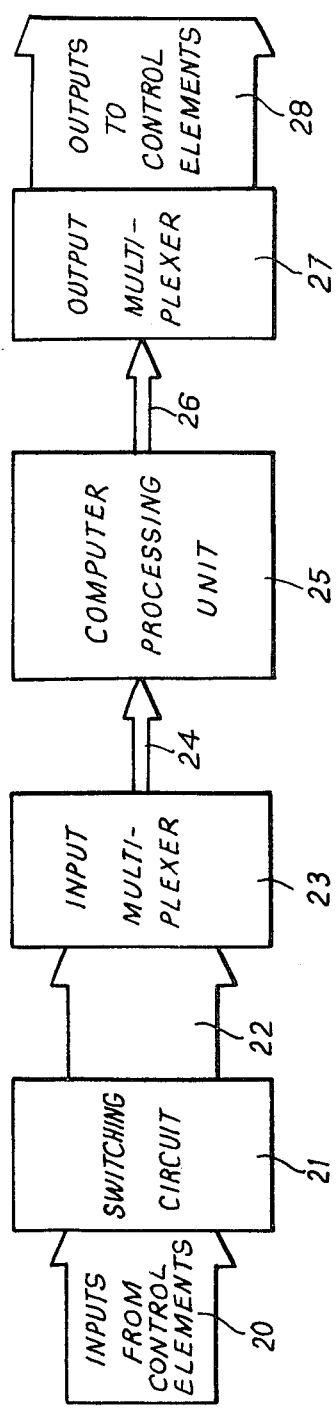
FIG. 1 is a block schematic diagram of computer based interlocking control set.

The system being referred to is shown in block diagram form in FIG. 1 to which reference will now be made. The inputs from the control elements (not shown) are received on a plurality of parallel cables 20 connected to a bank 21 of switching circuits. The switch bank 21 changes the signals by switching to an alternating waveform. The alternating signals are sent by means of a parallel data highway 22 to input multiplexer unit 23 which converts the input data to serial format comprising 8 bit, 16 bit or 32 bit words, as appropriate to the data processing equipment. The serial data highway 24 connects the input multiplexer 23 to computer central processing unit 25 which performs interlock and failure checking functions according to its stored programme sub-routines. The processing unit 25 generates control signals again according to its programmed functions which can allow for additional inputs from peripheral equipment (not shown) such as a manual keyboard when it is desired to set a new train route through the controlled area, for example. The processing units serial output highway 26 is connected to an output multi-plexer 27 which connects each output control signal to the correct one of the parallel lines 28 connected to the appropriate control element.

The central processing unit 25 carries out interlocking functions, route proving etc. according to routines laid down in its software programmes. Self-diagnostic routines can be written into these software programmes or stored off-line in special storage memories and called up as and when diagnostic routines are to be executed. Using such techniques the operation of the central processor 25 can be checked and self-diagnosis of faults carried out exhaustively down to quite small functional blocks. These programmes may be used during normal computer operation and can be run either by periodically interrupting execution of the principal programmes or in a background mode with the diagnostic tests being mixed with principal functional operations on a weighted priority basis.

This form of processor self-diagnosis is known and may be used to provide a high confidence factor for an interlocking processor, additionally the principle of availability by redundancy can be employed to ensure that even if one interlocking processor disqualifies itself, because of a self-diagnosed fault, at least one other identical processor is available to carry on safety interlocking functions in the meantime.

However a processor has to operate on the assumption that the data presented to it is correct, if this is not so the correct control signals will not be produced in all cases. As one example only, if an interlocking computer receives a track section unoccupied signal on a track circuit input, when in fact the section is occupied by a train, the safety sequence of red and yellow signals behind the train will not be implemented, a wrong side failure has occurred to produce the unsafe input. Traditionally a track circuit relay in an unoccupied track section is arranged to produce a signal corresponding to say, logic '1', when energised so that when a train enters the track section, or power is lost, the relay de-energises and produces '0'. Thus, any '0' on a track circuit interlocking input will result in safe interlocking output control signal. On the other hand a '1' input could result in unsafe conditions being erroneously set up so it is essential to have the highest possible confidence that a '1' input is genuine and not for example the result of a fault in a circuit receiving data for input to the interlocking computer.

The function of the switching circuit 21 is to force all the input logic signals to a logic '0' state and then to release the inputs allowing them to return to their actual input state i.e. either '0' or '1' according to the status of the relevant track circuit, point or signal. Thus if an input from a control element is '1' it will be changed to an alternating signal 0101 . . . etc. by the switching circuit 21. However if the input is '0' it will remain as a continuous '0'.

The switching circuit may operate asynchronously with respect to the data bit rate of the multi-plexers 23 and 27 and the computer processing unit 25. It is preferred however to operate a synchronous system since, as it will be readily appreciated by those skilled in the art, the data handling and precessing circuits are considerably simplified as compared to an asynchronous system.

The computer programme governing the operation of the processor 25 is designed to check that the input signals are either oscillating 0101 . . . etc., in a steady '0' state or in a steady '1' state. A steady '1' state, as already described, indicates a definite failure to a condition conducive to a dangerous situation arising i.e. a wrong side failure. In this event the programme requires that the relevant part of or the complete system is shut down, or does so automatically.

Figure 2:
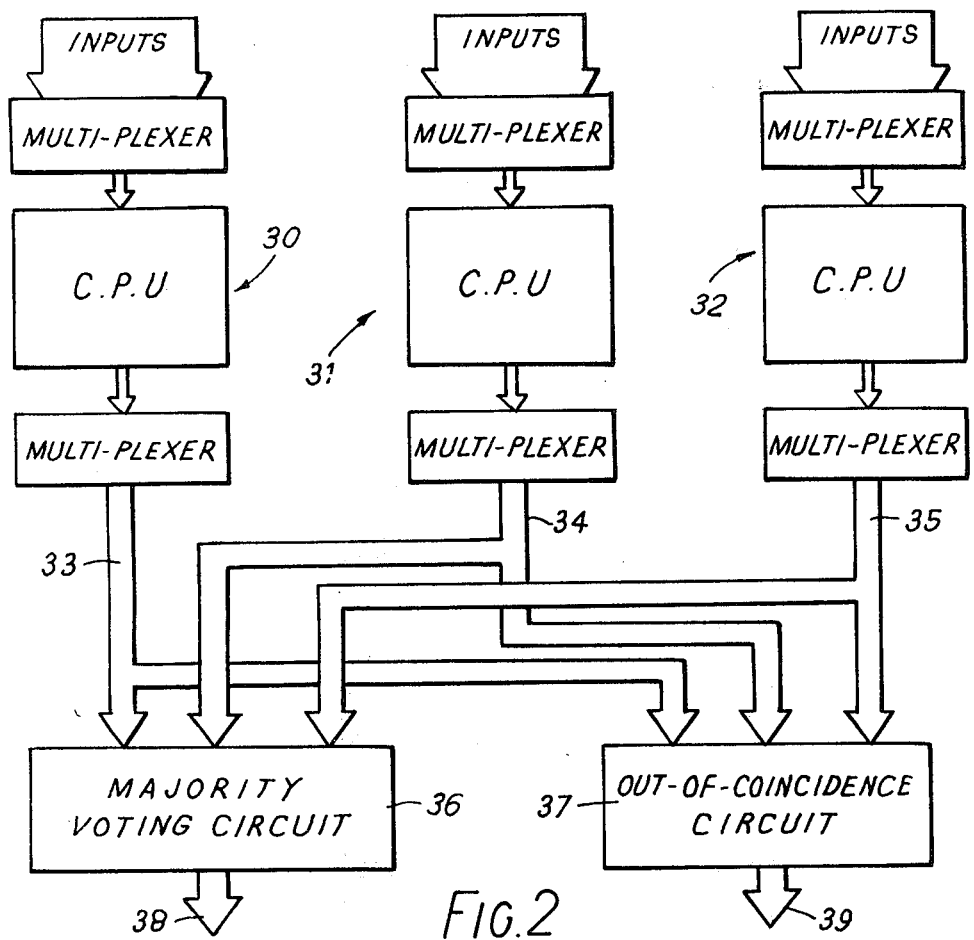
FIG. 2 is a block schematic diagram of similar control apparatus incorporating triple redundancy.

In order to increase the inherent reliability and safety of the traffic control system the interlocking equipment is triplicated, as shown in FIG. 2. Each of the three sub-systems, indicated generally at 30, 31 and 32, operates independently of its partners but uses the same input signals, and each produces independent output control signals 33, 34 and 35 respectively. These output signals are fed in parallel to a majority voting circuit 36 and also an out-of-coincidence circuit 37 schematic circuit diagrams of which are shown in FIG. 3 at (a) and (b) respectively.

The voting circuit 36 in FIG. 2 and FIG. 3(a) is designed according to "fail-safe" principles using relays as shown. Providing any two of the three inputs agree an output is produced, reference 38 in FIG. 2 and this provides one of the control signals 28 in FIG. 1.

The out-of-coincidence circuit 37 in FIG. 2 and FIG. 3(b) produces an output 39 only when all three sub-systems are in agreement. If this condition is not met the output 39 activates an alarm circuit to warn of a failure and automatically closes down either the relevant part of or the whole of the sub-system.

Referring now to FIG. 4(a), this shows a track circuit adapted to provide the oscillating signal necessary for dynamic interlocking according to the invention. As in a conventional track circuit a transmitter circuit, generally indicated by reference 41, is connected between the track rails as shown thereby forming a link to a receiver, indicated by reference 42, which is also connected between the rails. When the section of track between transmitter 41 and receiver 42 is unoccupied and switch 43 is closed the front (normally open) contact 44 of relay 45 is made, if switch 43 is opened the front contact 44 is broken when relay 45 drops out. Thus if switch 43 is made to oscillate relay 45 will be alternately energised and de-energised causing contact 44 to oscillate. If a train now enters the track circuit the rails are shorted, relay 45 drops out and contact 44 remains broken.

Contact 44 is connected in circuit with the control set interlocking equipment to provide a data input signal thereto relating to the occupancy of the track circuit. In conventional track circuits the data input signal can only occupy one of two states denoted '0' for contact 44 broken and '1' for contact 44 made. In a track circuit according to the invention the data signal may occupy a third state in which it alternates 0101 . . . etc.

With the conventional track circuit 000 . . . signifies an occupied track or a right side failure e.g. a broken wire, and 111 . . . signifies an unoccupied track or wrong side failure i.e. welded contacts 44. In the conventional system neither failure will be detected until a train next enters or tries to enter the track section concerned. According to the invention 000 . . . signifies an occupied track and a right side failure, 0101 . . . signifies an unoccupied track circuit ready to operate, and 111 . . . a failure mode indicating either a wrong side failure or the existence of a condition conducive to a wrong side failure.

FIG. 4(b) shows a three aspect signal lamp 50, following conventional practice the lamp is provided with a lamp filament proving relay 51 connected to prove continuity of the filaments of the red and yellow lamps.

The front (normally open) contacts 52 of relay 51 are also connected in circuit with the control set to provide a further input data signal thereto. In the circuit modified according to the invention an oscillating switch 53 is connected in series with contacts 52. Again if the data signal can be 0 or 1 an alternating signal 0101 . . . indicates that the signal lamps are in correct working order and 000 . . . indicates that lamp failure has occurred and is a right side failure, 111 . . . indicates a condition conducive to a wrong side failure because true indications of the state of the lamps are not being received.

FIG. 4(c) shows the data signal generating circuit for a points set comprising relay contacts 54 and 55 which are normally made when the points are set to normal and reverse positions respectively. Conventionally a pair of relays is associated with each points setting, a first relay of each pair indicating that the points have moved towards a selected position and the second indicating that the points have locked in position. The arrangement of FIG. 4(c) is simplified for the sake of clarity.

Oscillating switches 56 and 57 are connected in series with relay contacts 54 and 55 respectively in order to generate the interlocking data signals as previously described. Even in the simplified form shown in FIG. 4(c) a points set generates two data signals, one for each of normal and reverse settings, thus in order to detect points failure the interlocking data processing equipment must correlate the two signals. Normally one signal should be 000 . . . and the other 0101 . . . , any other combination of signals indicates failure at the points or between there and the interlock equipment and conditions conducive to wrong side failures.

The alternating signal switches referred to above may take any convenient form. For example, they may be relays the contacts of which are connected in the lines to be switched while the relay coils are connected to an oscillating signal source. In another form switching transistors connected directly to the oscillating source are used.

By injecting the alternating signals before the control element status switches the control element and all other equipment between there and that part of the interlock equipment responsive to the alternating signals is checked for failure. Thus by injecting the signals at subsequent points parts of the system furthest from the interlocking equipment may be omitted from the checking procedure. It is thus possible to have several different system configurations, for example; a computerbased self-checking interlocking system could replace a conventional relay interlocking system interfacing with existing unmodified control devices and retaining the conventional method of indicating and drawing attention to control device failures; or a similar computer based system in which checks of the control devices status switches are integrated with checks of the transmission links between the devices and the interlocking room.

Having thus described our invention what we claim is:

1. A control system comprising:
   a plurality of remote elements operative to alternative states by control signals,
   status indicating means connected to each remote element and arranged to provide a status signal indicative of the state occupied by the element,
   a plurality of signal paths each having an input end and an output end, each input end being connected to a status indicating means to carry the status signal therefrom,
   input circuit means connected between the output ends of the signal paths and a control signal generating means for generating the control signals for operating the remote elements, and
   switching means comprising a plurality of signal switches, each connected in a respective signal path and arranged to be operated in accordance with a signal from an oscillating signal source, for, when operated, forcing the signal carried by said signal path into a predetermined test state,
   said control signal generating means including means for detecting intermittent switching of an input signal path into a safe state, and the arrangement being such that by connection of a signal switch in a signal path in front of at least the input circuit means then at least said input circuit means will be proved not to have failed to a potentially unsafe state by detection by the control signal generating means of intermittent switching of said path into said safe state.

2. A railway control signal interlocking system comprising:
   a plurality of traffic control elements operative to alternative states by control signals,
   status indicating means connected to each controlled element and arranged to provide a status signal indicative of the state occupied by the traffic control element,
   a plurality of signal paths each having an input end and an output end, each input end being connected to a status indicating means to carry the status signal therefrom,
   input circuit means connected between the output ends of the signal paths and a control signal interlocking means for generating the control signals for operating the traffic control elements,
   switching means comprising a plurality of signal switches, each connected in a respective signal path and arranged to be operated in accordance with a signal from an oscillating signal source, for forcing the signal carried by said signal path into a predetermined test state which is equivalent to a safe status signal,
   said control signal interlocking means including means for detecting intermittent switching of an input signal path into a safe state, and the arrangement being such that by connection of a signal switch in a signal path in front of at least the input circuit means then at least said input circuit means will be proved not to have failed to a potentially unsafe state by detection by the control signal interlocking means of intermittent switching of said path into said safe state.

3. A railway control signal interlocking system according to claim 2 wherein the signal interlocking means comprises computer based data processing equipment.

4. A railway control signal interlocking means according to claim 3 wherein the input circuits to the signal interlocking means comprises multiplexing input means for receiving data from the plurality of signal paths and for supplying the data to a computer processing unit in serial format.

5. A railway control signal interlocking means according to claim 4 wherein the switching means operate in synchronism with the input data multiplexing means.

6. A railway control signal interlocking system according to claim 5 wherein the control signal interlocking means includes multiplexing output means for receiving data from the computer processing unit in serial format and supplying the data to the appropriate outputs of a plurality of control outputs.

7. A railway control signal interlocking means according to any one of claims 2, 3, 4, 5, or 6 wherein the switching means is located at the input to an input circuit of the interlocking means so as to prove that the input circuit has not failed to a possible wrong side failure mode.

8. A railway control signal interlocking means according to any one of claims 2, 3, 4, 5 or 6 wherein the switching means is located at the traffic control elements and is arranged in combination with an oscillating signal source coupled thereto so as to prove that the control element, the associated input circuit and connections therebetween have not failed to a possible wrong side failure mode.

9. A railway control signal interlocking means according to any one of claims 2, 3, 4, 5, or 6 wherein the status signal from a traffic control element may be steady in a first state, steady in a second state or alternating between the first and second states, the signal being steady in a predetermined one of the steady states when in a fault condition conducive to a wrong side failure, and the interlocking means is responsive to such a steady state signal to detect the fault condition.

* * * * *